(12) United States Patent
Phang et al.

(10) Patent No.: US 6,246,866 B1
(45) Date of Patent: Jun. 12, 2001

(54) DUAL BAND RECEIVER

(75) Inventors: Wayne M. Phang, Lantana; John K. McKinney, Plantation, both of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/205,216

(22) Filed: Dec. 4, 1998

(51) Int. Cl.[7] .................................................. H04B 1/18
(52) U.S. Cl. ................................... 455/188.2; 455/191.3; 455/553
(58) Field of Search .............................. 455/188.1, 188.2, 455/190.1, 191.3, 553, 260, 264

(56) References Cited

U.S. PATENT DOCUMENTS

| | | | | |
|---|---|---|---|---|
| 3,710,337 | * | 1/1973 | Grant | 343/701 |
| 4,724,399 | * | 2/1988 | Akinaga | 330/286 |
| 5,122,878 | * | 6/1992 | Heigl | 358/191.1 |
| 5,603,091 | * | 2/1997 | Linquist | 455/56.1 |

* cited by examiner

*Primary Examiner*—Vivian Chang
*Assistant Examiner*—James K. Moore
(74) *Attorney, Agent, or Firm*—Frank M. Scutch, III

(57) ABSTRACT

A receiver (100) provides dual band features by providing two signal paths (106, 108) off an antenna (102), one for UHF operation (106) and one for VHF operation (108). The two signals paths (106, 108) feed into a single broadband input (124) of a direct conversion receiver (114). The UHF path (106) utilizes UHF front end circuitry (110) while the VHF path (108) is implemented with a loading/isolator circuit (120) and a matching circuit (122). The loading/isolator circuit (120) loads the antenna (102) and isolates UHF signals while the matching circuit (122) provides a match between the loading isolator circuit (120) and the direct conversion recover (114). Selectable matching circuitry (126, 128) and selectable VCO circuitry (132, 134) configures the direct conversion receiver for the UHF or VHF mode of operation.

19 Claims, 2 Drawing Sheets

DUAL BAND RECEIVER

TECHNICAL FIELD

This invention relates in general to portable radios and more specifically to receiver circuits used in portable radios.

BACKGROUND

Dual band receiver capability in portable frequency modulated (FM) radios provides the ability to receive a broader range of frequencies. An example of a dual band receiver would be one that operates at both very high frequencies (VHF: 140–170 MHz) and ultra high frequencies (UHF: 400–512 MHz). Currently, portable FM radios achieve dual band capability through the use of separate receiver circuits. The use of separate receiver circuits, however, entails additional circuitry such as a crystal filter, a mixer, a low noise amplifier, a pre-selector as well as the added expense of a dual band antenna. For many radio products, particularly those competing in the low cost consumer arena, this additional circuitry is simply not an option, and thus these radios have tended to remain single band radios.

Radio users would greatly appreciate a product that has dual band capability without the additional cost typically associated with creating a dual band receiver. The ability to receive certain VHF frequencies would be particularly beneficial to the UHF radio user. For example, the FCC has allocated certain frequencies for particular functions such as the VHF 162 MHz band which is strictly used as a receive frequency for weather broadcasts, the 157 MHz band which is strictly used for marine reports, and HAM bands. A UHF radio that could provide VHF features, such as weather broadcasts and/or marine reports, would be very beneficial for sports enthusiasts, construction crews, family members, and other users of UHF consumer products.

Accordingly, there is a need for a portable radio which provides dual band capability without the need for separate receivers, complex circuitry, and additional space.

DETAILED DESCRIPTION OF THE PREFERRED EMBODIMENT

Figure 1:
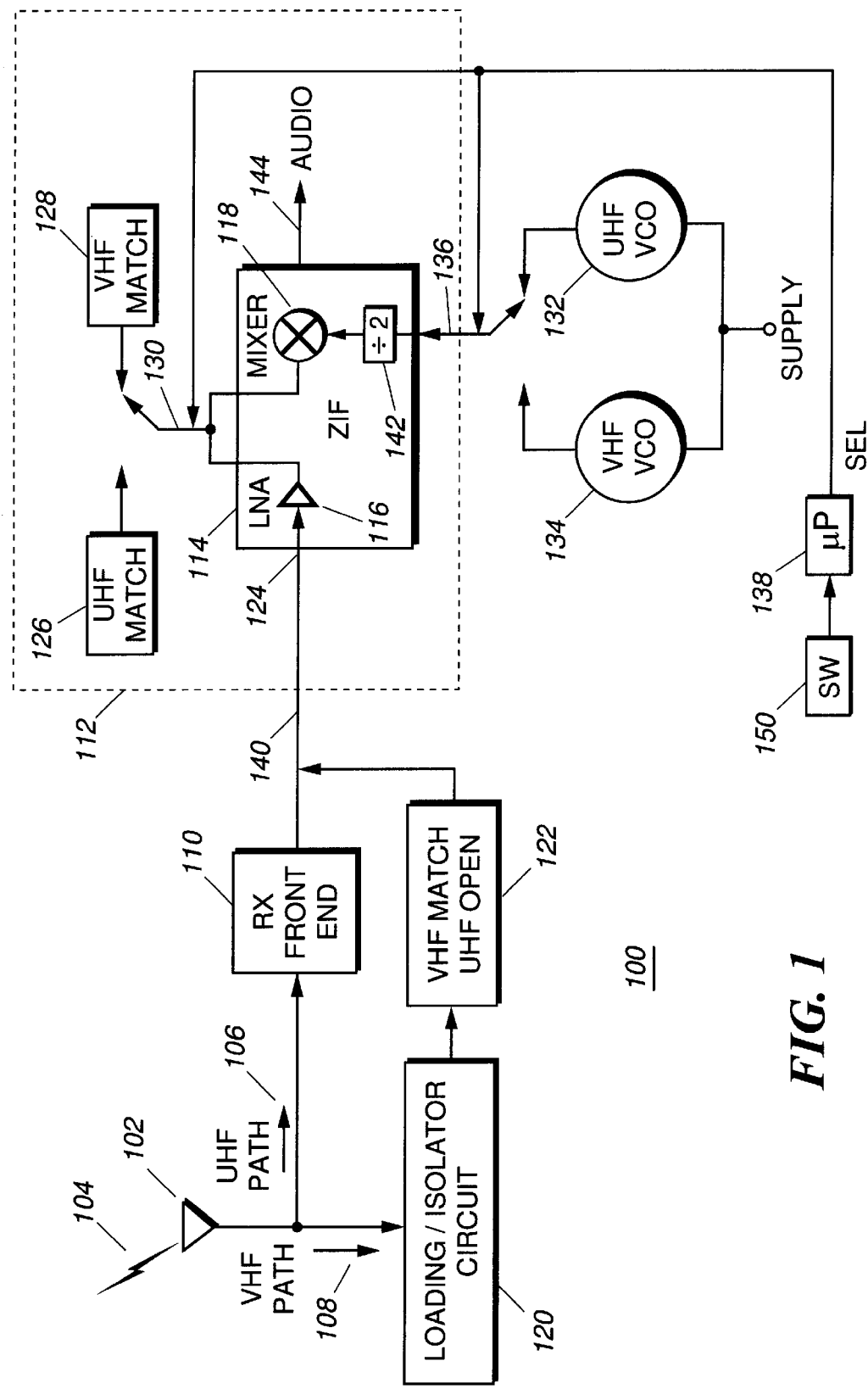
FIG. 1 is a block diagram of a receiver having dual band capacity in accordance with the present invention.

While the specification concludes with claims defining the features of the invention that are regarded as novel, it is believed that the invention will be better understood from a consideration of the following description in conjunction with the drawing figures, in which like reference numerals are carried forward.

A receiver circuit, to be described herein, provides dual band capability using a single direct conversion receiver without the use of separate front end receiver circuits. A UHF radio is thus capable of providing predetermined VHF features, such as the VHF weather channel.

Referring now to FIG. 1, there is shown a block diagram of a dual band receiver 100 such as would be used in a radio communications product in accordance with the present invention. The receiver 100 includes an antenna 102, preferably a UHF antenna, for receiving an RF signal 104. In accordance with the present invention, antenna 102 is coupled to two signal paths, preferably a UHF path 106 and a VHF path 108, for processing the RF signal 104. The UHF and VHF paths 106, 108 both feed into a common broadband input 124 of a direct conversion receiver, preferably a zero intermediate frequency (ZIF) receiver, 114.

The UHF path 106 consists of front end circuitry 110 for shaping a UHF carrier signal. In accordance with the present invention, the VHF path 108 includes a loading/isolator circuit 120 and matching circuit 122 which bypass the receiver front end circuitry 110. The VHF path 108, while designed for VHF receiver operation, does not interfere with the operation of the UHF front end 110. In accordance with the present invention, the loading/isolator circuit 120 presents a predetermined impedance which allows the passage of VHF signals and the attenuation of UHF signals. The loading/isolator circuit 120 of the present invention in conjunction with the UHF antenna accomplishes this by providing a large impedance (approximately an open circuit) to UHF frequencies in order to isolate UHF frequencies from the VHF signal path 108. The matching circuitry 122 provides a broadband match between the loading/isolator circuit 120 and the ZIF input 124 at VHF frequencies. This matching circuit 122 also serves as a UHF open circuit.

The ZIF 114 forms part of the back end circuitry 112 of the receiver 100 for receiving broad band (UHF and VHF) signals 140 and converting them down to baseband. The ZIF 114 includes a low noise amplifier (LNA) 116 and a mixer 118. In accordance with the present invention, receiver 100 includes first and second selectable matching circuits 126, 128 for matching the LNA 116 to the mixer 118 depending upon UHF or VHF operation. The first matching circuit 126 comprises UHF matching circuitry and the second matching circuit 128 comprises VHF matching circuitry. The selectable matching circuits 126, 128 are selectively coupled to the ZIF 114 through a switch 130 under microprocessor control 138.

In accordance with the present invention, first and second selectable voltage controlled oscillator circuits 132, 134 are provided to generate a local oscillator (LO) signal for either UHF or VHF operation. The first and second selectable VCO circuits 132, 134 are selectively coupled through switch 136 to the ZIF 114. Both the selectable UHF/VHF matching circuitry 126, 128 and selectable VCO circuitry 132, 134 are selected via microprocessor control 138.

One of the advantages of the receiver 100 of the present invention is that the same antenna 102, the same electro/mechanical hardware, and much of the same back end circuitry 112 can all serve to receive UHF frequencies as well as VHF frequencies. This commonality of circuitry reduces complexity, parts count, and cost. In operation, a user changes the radio operation from UHF to VHF (or VHF to UHF) by way of an electro/mechanical switch or other similar method represented by switch 150. The switching of the radio operation notifies the microprocessor 138 of the event, and in response thereto, the microprocessor selects the mixer match 126 or 128 and appropriate VCO circuitry 132 or 134 for the selected mode of operation.

For VHF operation, the radio is switched to a VHF operating mode and when a VHF signal is present, the following sequence of events occurs: antenna 102 receives the VHF signal, and the loading/isolator circuit 120 allows the passage of the VHF signal and the attenuation of UHF signals. The loading/isolator circuit 120 achieves this by loading the antenna with an appropriate impedance match, for example a 50 ohm impedance. Thus, the antenna 102 has effectively had its quarter wave resonant frequency loaded so that it resonates at VHF through the VHF path 108. The loading/isolator 120 also provides a large impedance (approximately an open circuit) to UHF frequencies in order to isolate UHF frequencies from the VHF signal path 108. The matching circuitry 122 provides a match for VHF signals traveling from the loading/isolator circuit 120 to the ZIF input 124 (which is a broadband UHF/VHF input impedance). Matching circuitry 122 also serves as a UHF open circuit.

Within the ZIF 114, the received RF signal 140 is amplified through LNA 116 and then impedance matched to the mixer 118 via the selected matching circuit 126 or 128. The selectable VCO circuitry 132, 134 generates a local oscillator (LO) frequency that is, in this configuration, twice that of the receive frequency 140. The mixer 118 receives the selected LO frequency via a divider 142, preferably located within the ZIF 114. Mixer 118 mixes the divided Lo signal and amplified RF signal down to baseband. Further processing within backend circuitry 112 takes place and finally an audio signal 144 is generated to be processed by the rest of the radio's audio circuitry, such as an audio amplifier and speaker (not shown).

Figure 2:
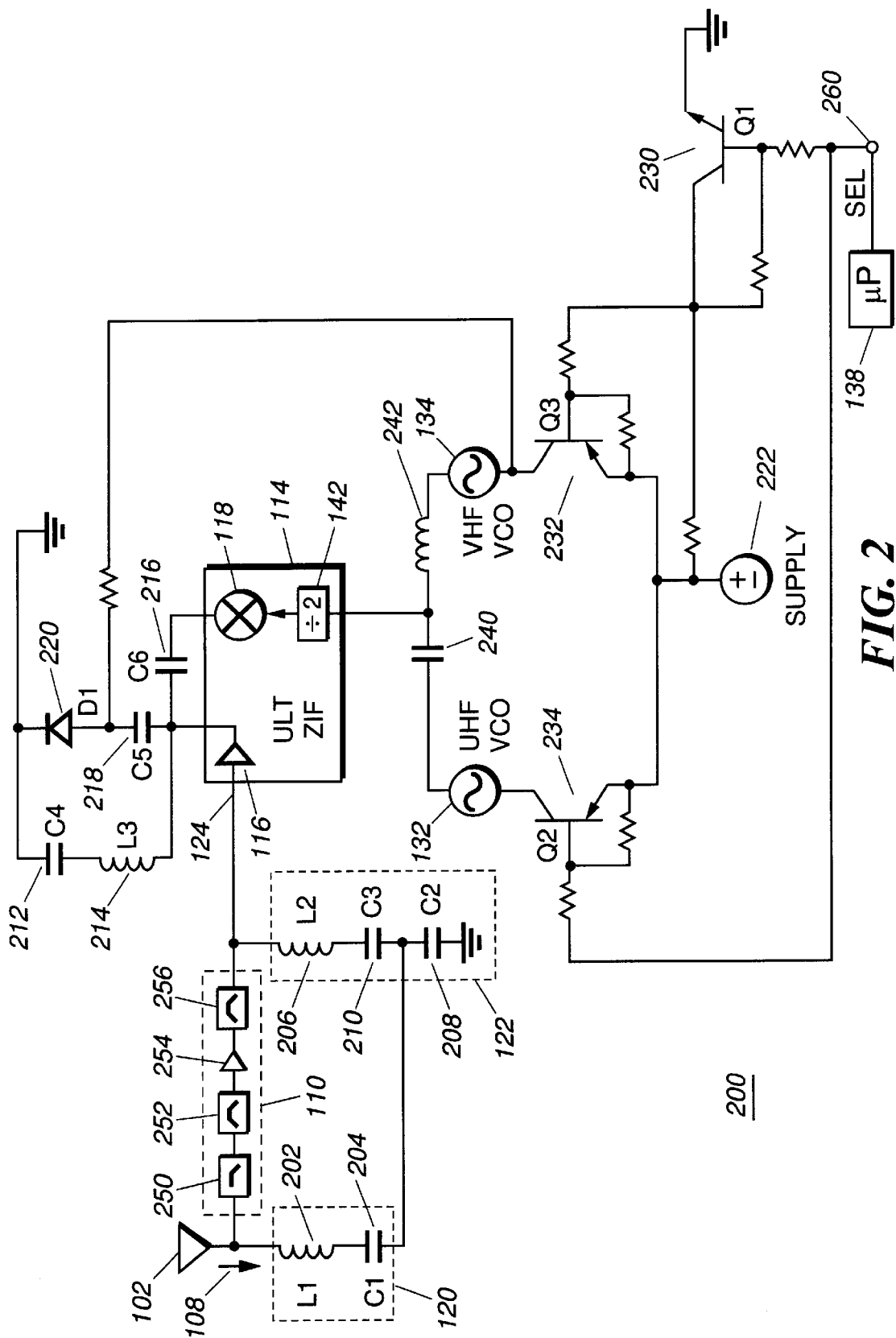
FIG. 2 is a more detailed example of the block diagram of FIG. 1 in accordance with a preferred embodiment of the invention.

Referring now to FIG. 2 there is shown an example of a more detailed embodiment of a receiver 200 formed in accordance with the preferred embodiment of the invention. A single front end receiver 110 is shown implemented with well known circuitry consisting of a harmonic filter 250, a two pole filter 252, a low noise amplifier 254, and a three pole filter 256. Other UHF front end configurations could be implemented as well. In accordance with the preferred embodiment of the invention, the loading/isolator circuit 120 is implemented with an inductor L1 202 and capacitor C1 204 coupled in series to the antenna 102. Component values for L1 202 and C1 204 are selected to provide the antenna with loading for VHF operation and isolation for UHF operation along the VHF path 108. In accordance with the preferred embodiment of the invention, matching circuit 122 is shown implemented with an inductor L2 206, a capacitor C2 208, and a capacitor C3 210. Component values of L2 206, C2 208, and C3 210 are selected to provide VHF matching between the loading/isolator circuit 120 to the broadband ZIF input 124 while providing a high impedance to block UHF frequencies.

In accordance with the preferred embodiment, a switch 220, preferably a pin diode switch D1 under microprocessor 138 control, determines the desired band of match as either UHF or VHF. The UHF matching circuit 126 is provided by capacitor C4 212, inductor L3 214, and capacitor C6 216. The VHF matching circuit 128 is provided by capacitor C5 218, inductor L3 214, capacitor C4 212, and capacitor C6 216. Diode D1 220 acts as a switch that has a high impedance when biased off for UHF operation and a low impedance when biased on for VHF operation. The diode D1 220 controls the output match of the ZIF amplifier 116 to the input of the ZIF mixer 118. Capacitor C5 218 is used to change the match of the amplifier 116 to the mixer 118 from a UHF to a VHF match. This matching occurs when diode D1 220 is turned on which causes capacitor C5 218 to be in parallel with inductor L3 214 and capacitor C4 212 (UHF bypass) thus changing the impedance of the matching circuit. When diode D1 220 is switched off, inductor L3 214 provides a UHF match from the ZIF amplifier 116 to the ZIF mixer 118. A variety of lumped component configurations can be implemented to produce the desired match between the LNA 116 and mixer 118.

In accordance with the preferred embodiment of the invention, the selectable matching circuits 126, 128 provide a unique match between the LNA amplifier 116 and the mixer 118. Having unique matching circuits for the selected frequency band provides improved gain and noise figure as well as improved receiver sensitivity for the incoming signal.

In response to a user changing operating modes, the microprocessor sends a select signal 260, such as a low for UHF operation, which turns off transistor Q1 230. With transistor Q1 230 switched off, the base of transistor Q3 232 will be pulled high via supply 222 which shuts off transistor Q3. Since the base of transistor Q2 234 is coupled to the select line 260 it will also go low which will cause transistor Q2 234 to be turned on. Turning on transistor Q2 234 supplies a bias voltage to the UHF VCO 132 thus allowing it to operate. Matching element capacitor 240 provides a high VHF impedance while inductor 242 provides a high UHF impedance. With transistor Q3 switched off, the VHF VCO will not operate and diode D1 220 will also be unbiased, which in turn isolates capacitor C5 218 from the mixer matching circuit.

To switch over to VHF operation, such as the weather mode of operation, the select line 260 is switched high which turns on transistor Q1 230, causing the base of transistor Q3 232 to be pulled low. This turns on transistor Q3 232 which supplies a bias voltage to the VHF VCO 134 as well as to diode D1 220. Matching element inductor 242 provides a high UHF impedance match. With diode D1 switched on, capacitor C5 218 is now in parallel with inductor L3 214 and capacitor C4 212 which alters the mixer match to a VHF match.

For VHF operation, the VHF VCO is typically twice that of the frequency of operation of the incoming received VHF signal. The ZIF 114 divides this incoming VHF VCO signal at divider 142, here shown as a divide-by-two divider. The ZIF mixer 118 mixes down the divided VCO frequency and incoming received signal providing a baseband signal for further receiver backend processing.

In accordance with the present invention, the combination of loading/isolator circuit 120 along with matching circuit 122 provides a receiver with dual band capability without the need for dual band antennas, separate front end circuitry, or separate hardware. Though the preferred embodiment of the invention describes a UHF radio having VHF capability, the concept of bypassing the receiver front end with a loading/isolator circuit and matching circuitry can be applied to other frequency bands of operation. Accordingly, a user can now enjoy dual band options without the additional cost typically associated with the extra hardware.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A dual band receiver, comprising:
    an antenna for receiving radio frequency (RF) signals, said RF signals consisting of the group of ultra-high frequency (UHF) and very-high frequency (VHF) signals;
    a receiver front end circuit coupled to the antenna for receiving the UHF signals and generating shaped UHF signals;
    a direct conversion receiver having a broadband input for receiving the shaped UHF signals from the front end receiver;

a loading/isolator circuit having an input and an output, the input being coupled to the antenna, the loading/isolator circuit operating as an isolator to the UHF signals and presenting a predetermined impedance to the VHF signals;

first and second selectable matching circuits coupled between the output of the loading/isolator circuit and the broad band input of the direct conversion receiver, the matching circuit providing an open to the UHF signals and a predetermined match for the VHF signals;

first and second selectable voltage controlled oscillator (VCO) circuits coupled to the direct conversion receiver; and a controller for controlling the first and second selectable matching circuits and the first and second selectable VCO circuits.

2. A dual band receiver as described in claim 1, wherein the antenna comprises a UHF narrowband antenna.

3. A dual band receiver as described in claim 1, wherein the loading/isolator circuit comprises lumped elements of an inductor and capacitor in series.

4. A dual band receiver as described in claim 1, wherein the VHF signals broadcast the weather.

5. A dual band receiver as described in claim 1, wherein the VHF signals broadcast marine reports.

6. A dual band receiver as described in claim 1, wherein the VHF signals broadcast HAM bands.

7. A dual band receiver as described in claim 1, wherein the direct conversion receiver comprises a zero intermediate frequency (ZIF) receiver.

8. A dual band receiver for providing first and second selectable frequency bands of operation, comprising:

an antenna for receiving radio frequency (RF) signals, the RF signals consisting of first or second frequency bands of operation;

a first signal path having a front end receiver for shaping RF signals from the first frequency band of operation;

a second signal path, bypassing the front end receiver, the second signal path comprising:
  a loading/isolator circuit having an input and an output, the input being coupled to the antenna for presenting a predetermined impedance to the second frequency band and isolating the first frequency band; and
  a matching circuit coupled to the output of the loading/isolator circuit for providing a substantially open circuit to the first frequency band and a predetermined match to the second frequency band;

a direct conversion receiver providing a broad band input, the broad band input serving as a common input to the to the first and second signal paths;

a control switch for selecting the frequency band of operation;

first and second selectable matching circuits responsive to the control switch for providing matching to the direct conversion receiver based on the selected frequency band of operation; and first and second selectable voltage controlled oscillator (VCO) circuits responsive to the control switch for providing a local oscillator (LO) signal to the direct conversion receiver based on the selected frequency band of operation.

9. A dual band receiver as described in claim 8, wherein the antenna comprises a UHF narrowband antenna.

10. A dual band receiver as described in claim 9, wherein the first frequency band of operation is an ultra high frequency (UHF) band of operation.

11. A dual band receiver as described in claim 10, wherein the second frequency band of operation is a very high frequency (VHF) band of operation.

12. A dual band receiver as described in claim 11, wherein the direct conversion receiver comprises a zero IF (ZIF) receiver.

13. A radio having dual band capability, comprising:

an antenna for receiving ultra high frequency (UHF) signals and very high frequency (VHF) signals;

a UHF front end receiver coupled to the antenna for shaping UHF signals;

a zero intermediate frequency (ZIF) integrated circuit having a broad band input for receiving the shaped UHF signals, the ZIF including a low noise amplifier (LNA) and a mixer;

selectable matching circuitry coupled to the ZIF for selectively matching the LNA to the mixer;

a loading/isolator circuit coupled to the antenna for processing VHF signals and isolating UHF signals;

a matching circuit coupled between the loading/isolator circuit and the broadband input of the ZIF;

selectable VCO circuitry coupled to the ZIF for selectively providing a local oscillator signal to the ZIF for either UHF or VHF operation; and a switch coupled to the selectable VCO circuitry and selectable matching circuitry for controlling the frequency mode of operation.

14. A radio as described in claim 13, wherein the switch is under microprocessor control.

15. A radio as described in claim 13, wherein the antenna comprises a UHF narrowband antenna.

16. A radio as described in claim 13, wherein the loading/isolator circuit comprises lumped elements of an inductor and capacitor in series.

17. A radio as described in claim 13, wherein the VHF signals broadcast the weather.

18. A radio as described in claim 17, wherein the VHF signals broadcast marine reports.

19. A radio as described in claim 18, wherein the VHF signals broadcast HAM bands.

* * * * *

UNITED STATES PATENT AND TRADEMARK OFFICE
CERTIFICATE OF CORRECTION

PATENT NO. : 6,246,866 B1
DATED : June 12, 2001
INVENTOR(S) : Phang et al.

It is certified that error appears in the above-identified patent and that said Letters Patent is hereby corrected as shown below:

<u>Title page,</u>
Item [54], delete the present title and insert therefor -- DUAL BAND DIRECT CONVERSION RECEIVER --.

Signed and Sealed this

Eleventh Day of June, 2002

Attest:

JAMES E. ROGAN
Attesting Officer — Director of the United States Patent and Trademark Office